(12) United States Patent
Yoshida et al.

(10) Patent No.: US 11,388,001 B2
(45) Date of Patent: Jul. 12, 2022

(54) ENCRYPTED COMMUNICATION DEVICE, ENCRYPTED COMMUNICATION SYSTEM, ENCRYPTED COMMUNICATION METHOD, AND PROGRAM

(71) Applicant: NIPPON TELEGRAPH AND TELEPHONE CORPORATION, Chiyoda-ku (JP)

(72) Inventors: Reo Yoshida, Musashino (JP); Tetsutaro Kobayashi, Musashino (JP); Yuto Kawahara, Musashino (JP); Tomohide Yamamoto, Musashino (JP); Hironobu Okuyama, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 197 days.

(21) Appl. No.: 16/635,373

(22) PCT Filed: Jul. 27, 2018

(86) PCT No.: PCT/JP2018/028183
§ 371 (c)(1),
(2) Date: Jan. 30, 2020

(87) PCT Pub. No.: WO2019/026776
PCT Pub. Date: Feb. 7, 2019

(65) Prior Publication Data
US 2021/0091946 A1    Mar. 25, 2021

(30) Foreign Application Priority Data
Aug. 2, 2017    (JP) .............................. JP2017-149603

(51) Int. Cl.
*H04L 9/12* (2006.01)
*H04L 9/06* (2006.01)
*H04L 9/08* (2006.01)

(52) U.S. Cl.
CPC ................ *H04L 9/12* (2013.01); *H04L 9/06* (2013.01); *H04L 9/0894* (2013.01)

(58) Field of Classification Search
CPC . H04L 9/12; H04L 9/06; H04L 9/0894; H04L 9/0838; H04L 9/14
(Continued)

(56) References Cited

U.S. PATENT DOCUMENTS

| 5,222,137 A | 6/1993 | Barrett et al. |
| 5,867,578 A * | 2/1999 | Brickell ................ H04L 9/3255 713/180 |

(Continued)

FOREIGN PATENT DOCUMENTS

| EP | 0 596 894 A1 | 5/1994 |
| JP | 2782954 B2 | 8/1998 |

(Continued)

OTHER PUBLICATIONS

Andreasen, F. et al, "Session Description Protocol (SDP)," [online], [searched on Jul. 18, 2017], the Internet <URL: https://tools.ietf.org/html/rfc4568>, total pp. 44.

(Continued)

*Primary Examiner* — Venkat Perungavoor
*Assistant Examiner* — Peiliang Pan
(74) *Attorney, Agent, or Firm* — Oblon, McClelland, Maier & Neustadt, L.L.P.

(57) ABSTRACT

An encrypted communication is correctly decrypted even when key exchange completion notification is delayed. A key storage (10) stores at least one common key which is shared with another encrypted communication device. A key (Continued)

selecting unit (11) selects an encryption key from the at least one common key stored in the key storage (10). An encrypting unit (12) generates encrypted data by encrypting, by using the encryption key, data to be transmitted to the other encrypted communication device. A transmitting unit (13) transmits, to the other encrypted communication device, the encrypted data with a key index, by which the encryption key is uniquely identified, added thereto. A receiving unit (14) receives the encrypted data with the key index added thereto from the other encrypted communication device. A key obtaining unit (15) obtains, from the at least one common key stored in the key storage (10), a decryption key corresponding to the key index added to the encrypted data. A decrypting unit (16) decrypts the encrypted data by using the decryption key.

6 Claims, 3 Drawing Sheets

(58) Field of Classification Search
USPC .......................................................... 380/262
See application file for complete search history.

(56) References Cited

U.S. PATENT DOCUMENTS

| | | | | |
|---|---|---|---|---|
| 6,567,914 | B1* | 5/2003 | Just | H04L 9/0819 380/278 |
| 6,711,264 | B1* | 3/2004 | Matsumoto | H04L 9/0891 380/277 |
| 7,383,435 | B2 | 6/2008 | Fellerer | |
| 2002/0080973 | A1* | 6/2002 | Cromer | G06F 21/31 380/282 |
| 2003/0035548 | A1* | 2/2003 | Kwan | H04L 63/04 380/286 |
| 2004/0202323 | A1 | 10/2004 | Fellerer | |
| 2010/0211787 | A1* | 8/2010 | Bukshpun | H04L 9/065 713/170 |
| 2011/0188654 | A1* | 8/2011 | Yao | H04L 9/08 380/255 |
| 2013/0144755 | A1* | 6/2013 | Mowatt | G06Q 30/06 705/26.41 |
| 2014/0122868 | A1* | 5/2014 | Kato | H04L 9/0833 713/155 |
| 2014/0181985 | A1* | 6/2014 | Mamidwar | G06F 21/10 726/26 |

FOREIGN PATENT DOCUMENTS

| | | | |
|---|---|---|---|
| JP | 2005-504479 | A | 2/2005 |
| JP | 2006-19975 | A | 1/2006 |
| JP | 2015-162889 | A | 9/2015 |
| WO | WO 92/17959 | A1 | 10/1992 |
| WO | WO 2004/055757 | A1 | 7/2004 |

OTHER PUBLICATIONS

Zimmermann, P. et al, "ZRTP: Media Path Key Agreement for Unicast Secure RTP", [online], [searched on Jul. 18, 2017], the Internet <URL: https://tools.ietf.org/html/rfc6189>, total pp. 115.
Dierks, T. et al, "The Transport Layer Security (TLS) Protocol", [online], [searched on Jul. 18, 2017], the Internet <URL: https://tools.ietf.org/html/rfc5246>, total pp. 104.
International Search Report dated Oct. 23, 2018 in PCT/JP2018/028183 filed on Jul. 27, 2018, 2 pages.

* cited by examiner

ENCRYPTED COMMUNICATION DEVICE, ENCRYPTED COMMUNICATION SYSTEM, ENCRYPTED COMMUNICATION METHOD, AND PROGRAM

TECHNICAL FIELD

The present invention relates to information communication technologies and, in particular, relates to a technology of synchronizing the timing to use a common key in encrypted communication.

BACKGROUND ART

In encrypted communication such as Session Description Protocol (SDP), Real-time Transport Protocol (RTP), and Transport Layer Security (TLS), a common key which is used for encryption is made usable immediately after the transmission or reception of an ACK message or a Finished message (hereinafter referred to as "key exchange completion notification") indicating the completion of a key exchange. The details of SDP are described in Non-patent Literature 1, the details of RTP are described in Non-patent Literature 2, and the details of TLS are described in Non-patent Literature 3.

For example, in encryption in an IP telephony system, by a multiparty key exchange technique, a Voice over Internet Protocol (VoIP) layer is notified of the completion of a key exchange as the return value of a terminal API in order to assure the completion of a key exchange between terminals which carry out communication. This makes it possible to reproduce a speech sound without interruption of a call even when keys are exchanged at high frequency in one VoIP session.

PRIOR ART LITERATURE

Non-Patent Literature

Non-patent Literature 1: "Session Description Protocol (SDP)", [online], [searched on Jul. 18, 2017], the Internet <URL: https://tools.ietf.org/html/rfc4568>
Non-patent Literature 2: "ZRTP: Media Path Key Agreement for Unicast Secure RTP", [online], [searched on Jul. 18, 2017], the Internet <URL: https://tools.ietf.org/html/rfc6189>
Non-patent Literature 3: "The Transport Layer Security (TLS) Protocol", [online], [searched on Jul. 18, 2017], the Internet <URL: https://tools.ietf.org/html/rfc5246>

SUMMARY OF THE INVENTION

Problems to be Solved by the Invention

However, in a best-effort network, an adequate communication band for a lower layer cannot be provided due to priority control or the like, which sometimes makes an encrypted communication arrive before key exchange completion notification. In this case, in spite of the fact that an exchange of a common key is completed, the common key cannot be used, which makes it impossible to decrypt the encrypted communication correctly. For instance, when a mobile virtual network operator (MVNO) network whose communication band is less than 100 kbps is used in a mobile network, it has been shown that a reception timing of key exchange completion notification, which is returned to each terminal from a server, is deviated in some terminals, which causes a phenomenon in which speech cannot be correctly decrypted temporarily.

In light of the foregoing, an object of the present invention is to implement an encrypted communication technology that can correctly decrypt an encrypted communication even when key exchange completion notification is delayed.

Means to Solve the Problems

In order to solve the above-described problem, an encrypted communication device of the present invention includes: a key storage that stores at least one common key which is shared with another encrypted communication device; a key selecting unit that selects an encryption key from the at least one common key stored in the key storage; an encrypting unit that generates encrypted data by encrypting, by using the encryption key, data to be transmitted to the other encrypted communication device; a transmitting unit that transmits, to the other encrypted communication device, the encrypted data with a key index, by which the encryption key is uniquely identified, added thereto; a receiving unit that receives the encrypted data with the key index added thereto from the other encrypted communication device; a key obtaining unit that obtains, from the at least one common key stored in the key storage, a decryption key corresponding to the key index added to the encrypted data; and a decrypting unit that decrypts the encrypted data by using the decryption key.

Effects of the Invention

With the encrypted communication technology of the present invention, it is possible to decrypt an encrypted communication correctly even when key exchange completion notification is delayed.

DETAILED DESCRIPTION OF THE EMBODIMENTS

Figure 1:
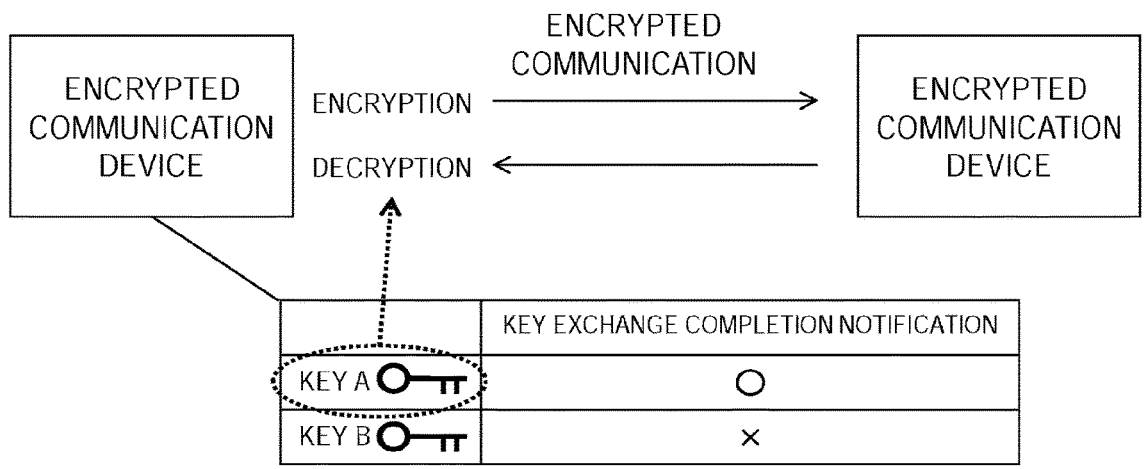
FIG. 1 is a diagram for explaining an existing encrypted communication technology.

FIG. 1 shows how a common key is used in an existing encrypted communication technology. An example of FIG. 1 illustrates a situation in which a key A and a key B were exchanged between two encrypted communication devices and, while key exchange completion notification for the key A has been received, key exchange completion notification for the key B has not been received. If an encrypted communication device on the transmitting side performs encryption by using the key B in this situation, an encrypted communication device on the receiving side cannot correctly decrypt an encrypted communication because the encrypted communication device cannot use the key B.

Figure 2:
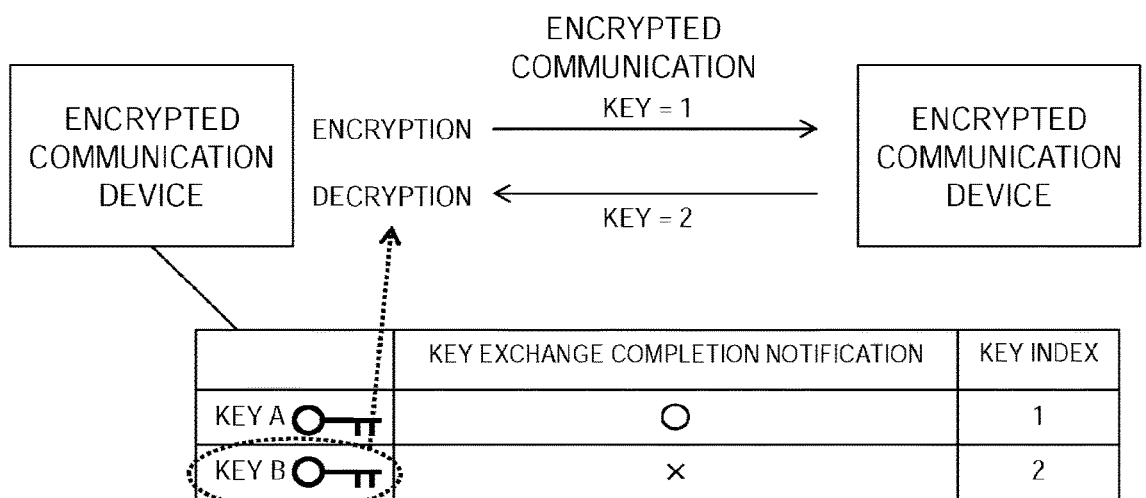
FIG. 2 is a diagram for explaining an encrypted communication technology of the present invention.

In the present invention, at the time of transmission of an encrypted communication, a key index, by which a common key used for encryption is uniquely identified, is added to encrypted data and transmitted therewith and, at the time of reception of the encrypted communication, a common key corresponding to the key index is obtained and the received encrypted data is decrypted. FIG. 2 shows how a common key is used in an encrypted communication technology of the present invention. In an example of FIG. 2, an encrypted communication device has a key database of a common key and a key index which are correlated with each other, and an encrypted communication device on the transmitting side transmits a key index (=2) corresponding to a key B used for encryption to an encrypted communication device on the receiving side. Although the encrypted communication device on the receiving side has not yet received key exchange completion notification for the key B, the encrypted communication device on the receiving side can correctly decrypt the encrypted data by using the key B because the encrypted communication device can obtain the key B from the key database by using the key index as a key.

The example of FIG. 2 is based on the assumption that creating the database is performed by sharing a key index with the same timing as a key exchange; however, the example is not limited to this mode because a key index only has to be a key index by which a common key can be uniquely identified. For instance, a configuration may be adopted in which a one-way function which is shared between an encrypted communication device on the transmitting side and an encrypted communication device on the receiving side is provided; at the time of transmission, an output which is obtained when a common key used for encryption is input to the one-way function is added to encrypted data as a key index and transmitted therewith and, at the time of reception, a common key is obtained, the common key by which an output, which is equal to the received key index, is obtained when the common key held by an encrypted communication device is input to the one-way function, and the encrypted data is decrypted. When a key exchange is performed between two encrypted communication devices, one encrypted communication device generates a key index and transmits the key index to the other encrypted communication device, whereby the encrypted communication devices can share the key index. When a key management server, which is different from an encrypted communication device, generates a common key and distributes the common key to encrypted communication devices to perform a key exchange, the key management server generates a key index and distributes the key index to the encrypted communication devices with the common key, whereby the encrypted communication devices can share the key index.

Hereinafter, embodiments of the present invention will be described in detail. In the drawings, constituent units having the same function are identified with the same reference character, and overlapping explanations will be omitted.

First Embodiment

Figure 3:
FIG. 3 is a diagram illustrating the functional configuration of an encrypted communication system.

As illustrated in FIG. 3, an encrypted communication system of a first embodiment includes a plurality of encrypted communication devices 1. FIG. 3 shows an example in which two encrypted communication devices $1_1$ and $1_2$ are present; the number of encrypted communication devices 1 is not limited as long as two or more encrypted communication devices 1 are present. In the following description, it is assumed that the encrypted communication device $1_1$ encrypts data and transmits the encrypted data and the encrypted communication device $1_2$ decrypts the received encrypted data. In this embodiment, the encrypted communication device $1_1$ and the encrypted communication device $1_2$ are connected to a communication network 2. The communication network 2 is a circuit switching or packet-switching communication network that allows devices connected thereto to communicate with each other on a one-to-one basis, and, for example, the Internet, a local area network (LAN), a wide area network (WAN), or the like can be used. The devices do not necessarily have to be able to communicate with each other online via the communication network 2. For instance, a configuration may be adopted in which information which is output from the encrypted communication device $1_1$ is stored in a portable recording medium such as a magnetic tape or Universal Serial Bus (USB) memory and the information is input to the encrypted communication device $1_2$ from the portable recording medium offline.

Figure 4:
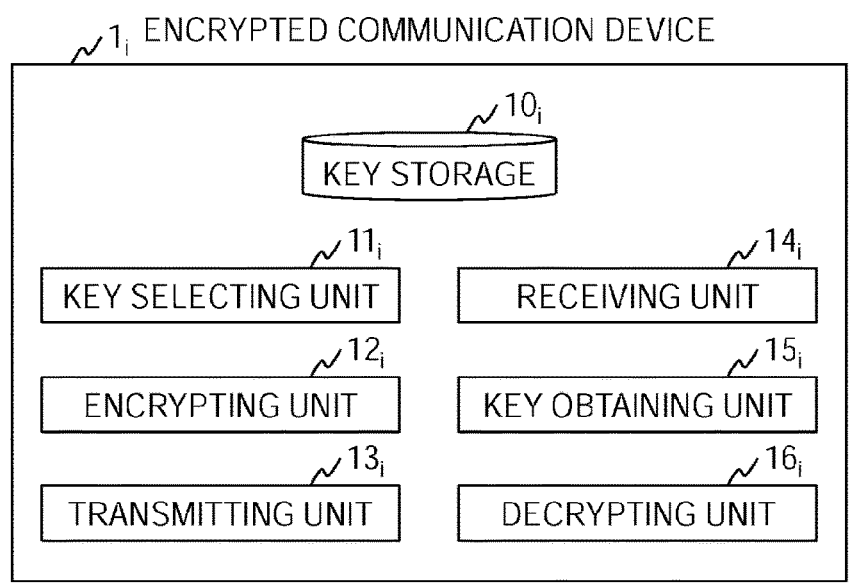
FIG. 4 is a diagram illustrating the functional configuration of an encrypted communication device.

As illustrated in FIG. 4, the encrypted communication device $1_i$ (i=1, 2) included in the encrypted communication system includes a key storage $10_i$, a key selecting unit $11_i$, an encrypting unit $12_i$, a transmitting unit $13_i$, a receiving unit $14_i$, a key obtaining unit $15_i$, and a decrypting unit $16_i$. As a result of the two encrypted communication devices $1_1$ and $1_2$ performing processing in steps shown in FIG. 5 in cooperation with each other, an encrypted communication method of the first embodiment is implemented.

The encrypted communication device $1_i$ is a special device configured as a result of a special program being read into a publicly known or dedicated computer including, for example, a central processing unit (CPU), a main storage unit (random access memory: RAM), and so forth. The encrypted communication device $1_i$ executes each processing under the control of the central processing unit, for example. The data input to the encrypted communication device 1 and the data obtained by each processing are stored in the main storage unit, for instance, and the data stored in the main storage unit is read into the central processing unit when necessary and used for other processing. At least part of each processing unit of the encrypted communication device $1_i$ may be configured with hardware such as an integrated circuit. Each storage of the encrypted communication device $1_i$ can be configured with, for example, a main storage unit such as random access memory (RAM), an auxiliary storage unit configured with a hard disk, an optical disk, or a semiconductor memory device such as flash memory, or middleware such as a relational database or a key-value store.

Figure 5:
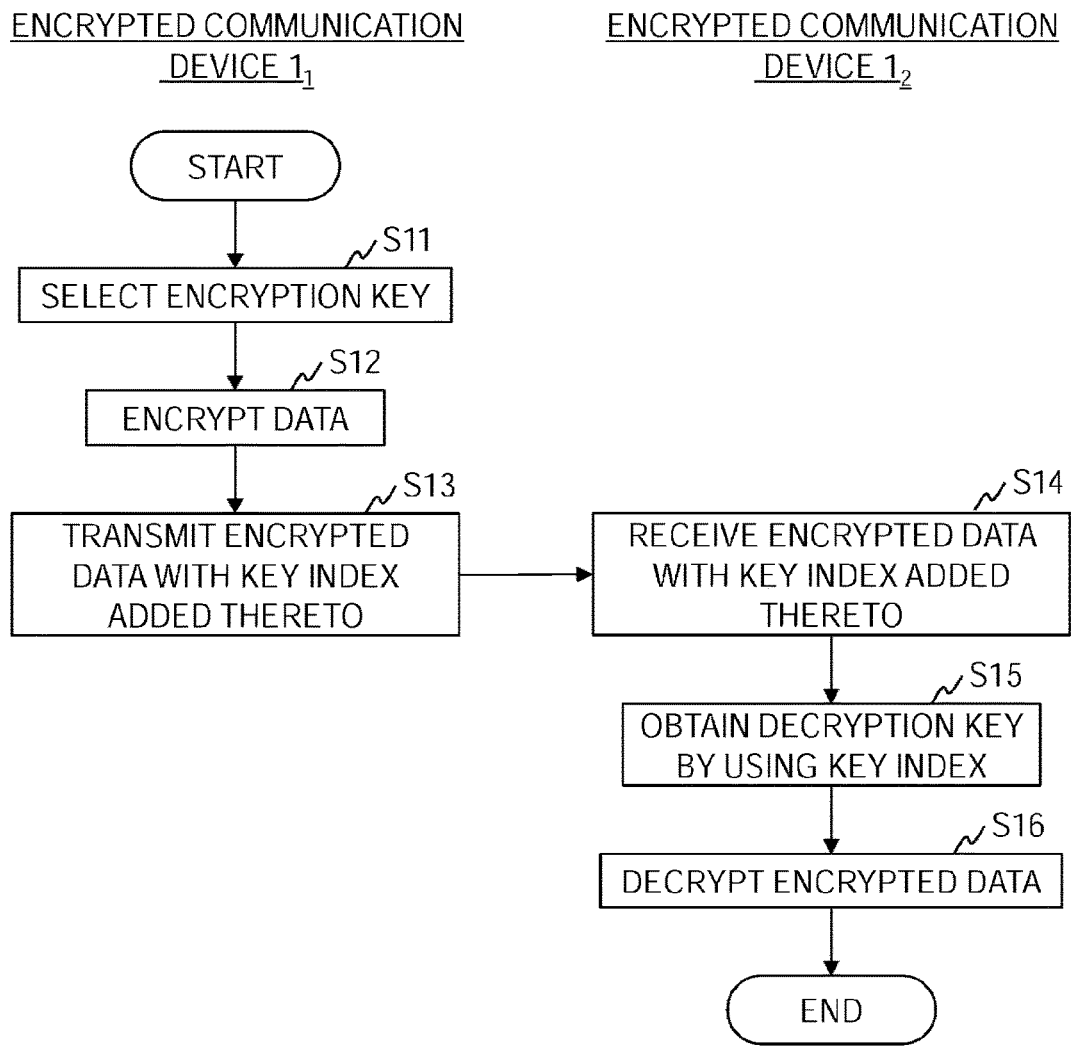
FIG. 5 is a diagram illustrating a procedure of an encrypted communication method.

Hereinafter, the encrypted communication method which is executed by the encrypted communication system of the first embodiment will be described with reference to FIG. 5.

In the key storage $10_1$ of the encrypted communication device $1_1$ on the transmitting side, at least one common key, which is shared with the encrypted communication device $1_2$ on the receiving side, and a key index, by which each common key is uniquely identified, are stored in a state in which they are correlated with each other. In the key storage $10_2$ of the encrypted communication device $1_2$ on the receiving side, the at least one common key, which is shared with the encrypted communication device $1_1$ on the transmitting side, and the key index, by which each common key is uniquely identified, are stored in a state in which they are correlated with each other. Here, "each common key is uniquely identified" means that each common key can be uniquely identified in the entire encrypted communication system, not that each common key is uniquely identified in each key storage $10_i$. That is, when a key index of a common key A which is stored in the key storage $10_1$ is 1 and a key index of a common key B which is stored therein is 2, a key index of the common key A which is stored in the key storage $10_2$ is also 1 and a key index of the common key B which is stored therein is also 2. When the encrypted communication device $1_i$ (i=1, 2) communicates also with the other encrypted communication device $1_j$ (j=1, 2 and i≠j), for each encrypted communication device $1_j$ with which the encrypted communication device $1_i$ communicates, the encrypted communication device $1_i$ only has to store at least one common key, which is shared with the encrypted communication device $1_j$, and a key index, by which each common key is uniquely identified, in a state in which they are correlated with each other. As a method by which the encrypted communication device $1_1$ and the encrypted communication device $1_2$ share a common key, an existing key exchange technology can be used.

In Step S11, the key selecting unit $11_1$ of the encrypted communication device $1_1$ selects one common key which is used for encryption from the at least one common key stored in the key storage $10_1$ and obtains the selected common key and a key index correlated with the common key from the key storage $10_1$. Hereinafter, the selected common key is referred to as the "encryption key". In this case, the key selecting unit $11_1$ may select a common key, for which key exchange completion notification has not been received, of the at least one common key stored in the key storage $10_1$. The key selecting unit $11_1$ outputs a set made up of the selected encryption key and the key index to the encrypting unit $12_1$.

In Step S12, the encrypting unit $12_1$ of the encrypted communication device $1_1$ receives the set made up of the encryption key and the key index from the key selecting unit $11_1$ and encrypts data to be transmitted to the encrypted communication device $1_2$ by using the encryption key. As an encryption scheme which is used by the encrypting unit $12_1$, an existing encryption scheme defined by a communication protocol corresponding to data to be transmitted can be used. Hereinafter, the data which is encrypted is referred to as the "encrypted data". The encrypting unit $12_1$ outputs a set made up of the generated encrypted data and the key index to the transmitting unit $13_1$.

In Step S13, the transmitting unit $13_1$ of the encrypted communication device $1_1$ receives the set made up of the encrypted data and the key index from the encrypting unit $12_1$ and transmits the encrypted data with the key index added thereto to the encrypted communication device $1_2$.

In Step S14, the receiving unit $14_2$ of the encrypted communication device $1_2$ receives the encrypted data with the key index added thereto from the encrypted communication device $1_1$. This key index is a key index corresponding to the encryption key used when the encrypted data was encrypted and is a key index corresponding to any one of the at least one common key stored in the key storage $10_2$ of the encrypted communication device $1_2$. The receiving unit $14_2$ outputs the received key index to the key obtaining unit $15_2$ and outputs the received encrypted data to the decrypting unit $16_2$.

In Step S15, the key obtaining unit $15_2$ of the encrypted communication device $1_2$ receives the key index from the receiving unit $14_2$ and retrieves and obtains a common key correlated with the key index from the key storage $10_2$ of the encrypted communication device $1_2$. Hereinafter, the obtained common key is referred to as the "decryption key". It goes without saying that, since the encryption key and the decryption key are correlated with the same key index, they are one and the same common key. The key obtaining unit $15_2$ outputs the obtained decryption key to the decrypting unit $16_2$.

In Step S16, the decrypting unit $16_2$ of the encrypted communication device $1_2$ receives the decryption key from the key obtaining unit $15_2$ and decrypts the encrypted data received from the receiving unit $14_2$ by using the decryption key. A decryption scheme which is used by the decrypting unit $16_2$ is a decryption scheme corresponding to the encryption scheme used by the encrypting unit $12_1$.

As a result of the encrypted communication system of the first embodiment being configured as described above, the encrypted communication system transmits encrypted data with a key index, which corresponds to a common key used for encryption, added thereto, which makes it possible to use even a common key, for which key exchange completion notification has not been received, for encryption and decryption if a key exchange itself is completed. Thus, even when key exchange completion notification is delayed due to the influence of, for example, priority control of a network or the like and encrypted data arrives before the key exchange completion notification, the encrypted data can be correctly decrypted.

Second Embodiment

In the first embodiment, a configuration in which a key index, by which each common key is uniquely identified, is stored in advance in the key storage $10_i$ in a state in which a key index is correlated with each common key has been described. In an encrypted communication system of a second embodiment, a configuration is adopted in which a key index is generated as occasion arises by using a one-way function which is shared between encrypted communication devices. Hereinafter, a difference between the encrypted communication system of the second embodiment and the encrypted communication system of the first embodiment will be mainly described.

In the key storage $10_1$ of the encrypted communication device $1_1$ of the second embodiment, at least one common key, which is shared with the encrypted communication device $1_2$ on the receiving side, and a one-way function, which is shared with the encrypted communication device $1_2$ of the second embodiment, are stored. In the key storage $10_2$ of the encrypted communication device $1_2$ of the second embodiment, at least one common key, which is shared with the encrypted communication device $1_1$ on the transmitting side, and the one-way function, which is shared with the encrypted communication device $1_1$ of the second embodiment, are stored. As this one-way function, a hash function such as SHA-256 can be used.

In Step S11, the key selecting unit $11_1$ of the encrypted communication device $1_1$ selects one encryption key which is used for encryption from the at least one common key stored in the key storage $10_1$ and obtains the selected encryption key from the key storage $10_1$. Moreover, the key selecting unit $11_1$ generates an output which is obtained when the obtained encryption key is input to the one-way function stored in the key storage $10_1$ as a key index. The key selecting unit $11_1$ outputs a set made up of the selected encryption key and the key index to the encrypting unit $12_1$.

The processing from Steps S12 to S14 is the same as that of the first embodiment.

In Step S15, the key obtaining unit $15_2$ of the encrypted communication device $1_2$ receives the key index from the receiving unit $14_2$ and obtains a common key by which an output, which is equal to the received key index, is obtained when the common key stored in the key storage $10_2$ is input to the one-way function stored in the key storage $10_2$ as a decryption key. The key obtaining unit $15_2$ outputs the obtained decryption key to the decrypting unit $16_2$.

The processing in Step S16 is the same as that of the first embodiment.

As a result of the encrypted communication system of the second embodiment being configured as described above, although the amount of computation needed to calculate a key index every time an encryption key is selected and every time a decryption key is obtained is increased, there is no need to store a key index in advance in the encrypted communication devices in such a way that the key index is shared therebetween, which eliminates the need for key index sharing processing at the time of a key exchange and makes it possible to reduce the capacity of the key storage $10_i$ of the encrypted communication device $1_i$.

While the embodiments of the present invention have been described, specific configurations are not limited to these embodiments, but design modifications and the like within a range not departing from the spirit of the invention are encompassed in the scope of the invention, of course. The various processes described in the embodiments may be executed in parallel or separately depending on the processing ability of a device executing the process or on any necessity, rather than being executed in time series in accordance with the described order.

[Program and Recording Medium]

When various types of processing functions in the devices described in the above embodiments are implemented on a computer, the contents of processing function to be contained in each device is written by a program. With this program executed on the computer, various types of processing functions in the above-described devices are implemented on the computer.

This program in which the contents of processing are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage unit of a server computer and transferred from the server computer to other computers via a network so as to be distributed.

A computer which executes such program first stores the program recorded in a portable recording medium or transferred from a server computer once in a storage unit thereof, for example. When the processing is performed, the computer reads out the program stored in the storage unit thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that a program according to the present embodiment includes information which is provided for processing performed by electronic calculation equipment and which is equivalent to a program (such as data which is not a direct instruction to the computer but has a property specifying the processing performed by the computer).

In the present embodiment, the present device is configured with a predetermined program executed on a computer. However, the present device may be configured with at least part of these processing contents realized in a hardware manner.

What is claimed is:

1. An encrypted communication device comprising:
   a key storage that stores at least one common key which is shared with another encrypted communication device; and
   processing circuitry configured to:
   receive a notification indicating the completion of a key exchange;
   select an encryption key from the at least one common key stored in the key storage regardless of receiving the notification;
   generate encrypted data by encrypting, by using the encryption key, data to be transmitted to the other encrypted communication device;
   transmit, to the other encrypted communication device, the encrypted data with a key index, by which the encryption key is uniquely identified, added thereto;
   receive the encrypted data with the key index added thereto from the other encrypted communication device;
   obtain, from the at least one common key stored in the key storage, a decryption key corresponding to the key index added to the encrypted data; and
   decrypt the encrypted data by using the decryption key.

2. The encrypted communication device according to claim 1, wherein
   the key storage stores a key index, by which each common key is uniquely identified, in a state in which the key index is correlated with each common key,
   the processing circuitry selects the encryption key from the at least one common key stored in the key storage and obtains the key index correlated with the encryption key, and
   the processing circuitry obtains, as the decryption key, the common key correlated with a same key index as the key index added to the encrypted data from the at least one common key stored in the key storage.

3. The encrypted communication device according to claim 1, wherein
   the processing circuitry selects the encryption key from the at least one common key stored in the key storage and obtains, as the key index, an output which is obtained when the encryption key is input to a one-way function, and
   the processing circuitry obtains, as the decryption key, the common key by which an output, which is equal to the key index added to the encrypted data, is obtained when the common key stored in the key storage is input to the one-way function.

4. A non-transitory computer-readable recording medium on which a program is recorded for causing a computer to function as the encrypted communication device according to claim 1.

5. An encrypted communication system in which a plurality of encrypted communication devices transmit and receive encrypted data, wherein
   each encrypted communication device includes a key storage that stores at least one common key which is shared with another encrypted communication device, and processing circuitry configured to:

receive a notification indicating the completion of a key exchange;

select an encryption key from the at least one common key stored in the key storage regardless of receiving the notification;

generate the encrypted data by encrypting, by using the encryption key, data to be transmitted to the other encrypted communication device;

transmit, to the other encrypted communication device, the encrypted data with a key index, by which the encryption key is uniquely identified, added thereto;

receive the encrypted data with the key index added thereto from the other encrypted communication device;

obtain, from the at least one common key stored in the key storage, a decryption key corresponding to the key index added to the encrypted data; and decrypt the encrypted data by using the decryption key.

6. An encrypted communication method by which a first encrypted communication device and a second encrypted communication device transmit and receive encrypted data, wherein the first encrypted communication device stores at least one common key, which is shared with the second encrypted communication device, in a first key storage, the encrypted communication method comprising:

storing, by the second encrypted communication device, the at least one common key, which is shared with the first encrypted communication device, in a second key storage;

receiving, by the first encrypted communication device, a notification indicating the completion of a key exchange;

selecting, by the first encrypted communication device, an encryption key from the at least one common key stored in the first key storage regardless of receiving the notification;

generating, by the first encrypted communication device, the encrypted data by encrypting, by using the encryption key, data to be transmitted to the second encrypted communication device;

transmitting, by the first encrypted communication device, to the second encrypted communication device, the encrypted data with a key index, by which the encryption key is uniquely identified, added thereto;

receiving, by the second encrypted communication device, the encrypted data with the key index added thereto from the first encrypted communication device;

obtaining, by the second encrypted communication device, from the at least one common key stored in the second key storage, a decryption key corresponding to the key index added to the encrypted data; and decrypting by the second encrypted communication device, the encrypted data by using the decryption key.

* * * * *